UNITED STATES PATENT OFFICE.

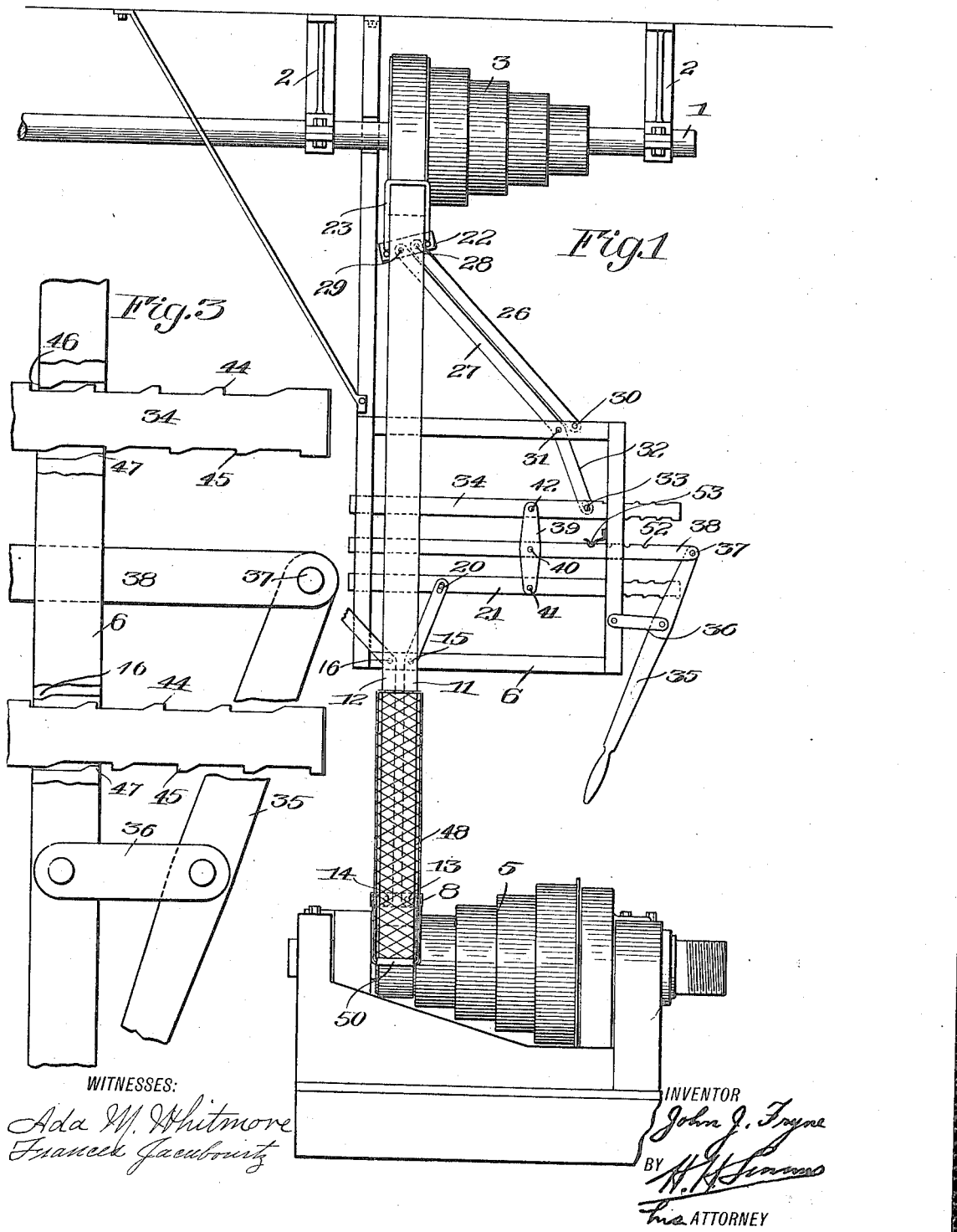

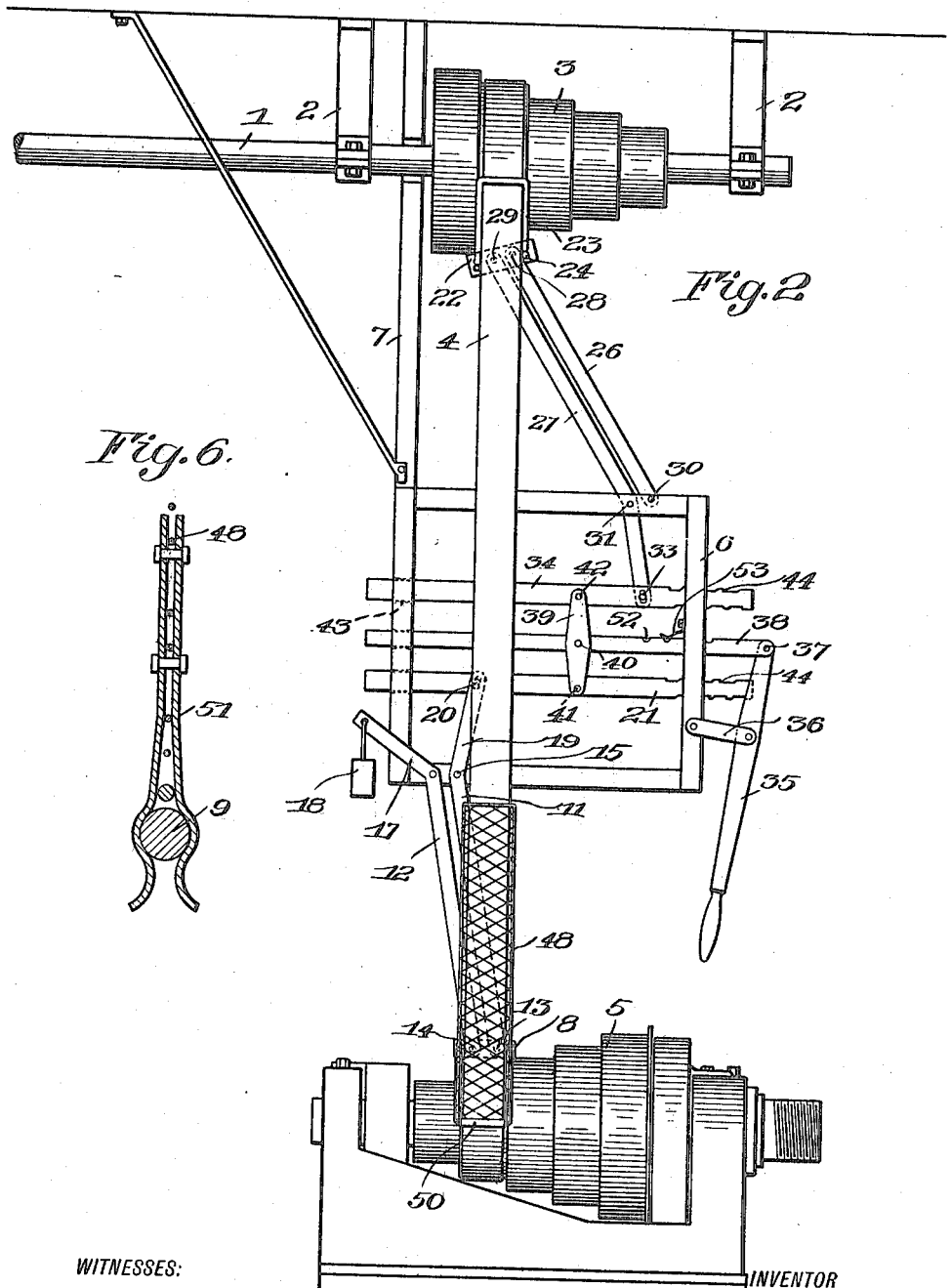

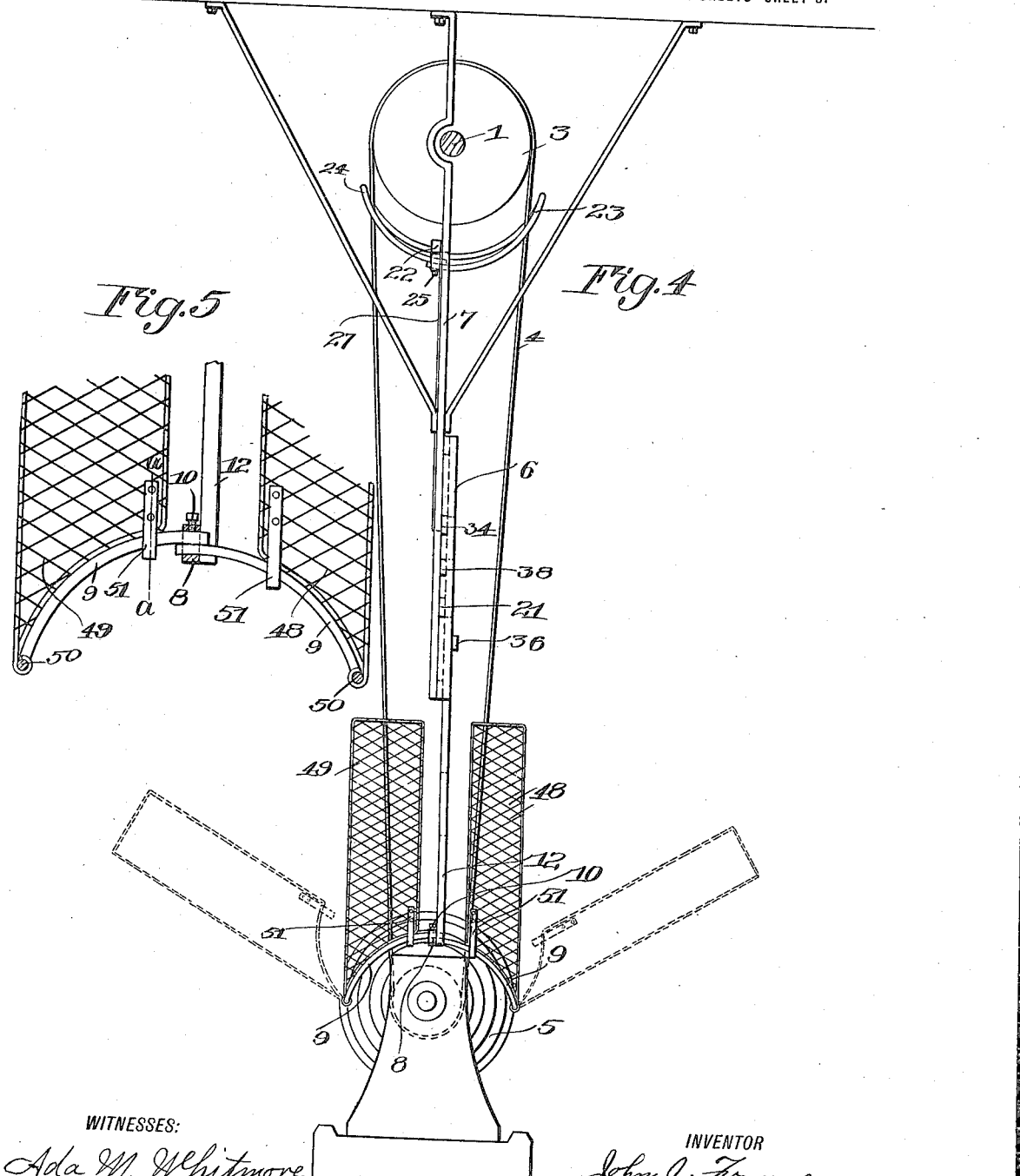

JOHN J. FRYNE, OF ROCHESTER, NEW YORK.

BELT-SHIFTER.

1,196,347.   Specification of Letters Patent.   Patented Aug. 29, 1916.

Application filed December 21, 1914.   Serial No. 878,389.

*To all whom it may concern:*

Be it known that I, JOHN J. FRYNE, of Rochester, in the county of Monroe and State of New York, have invented a new and useful Improvement in Belt-Shifters, which improvement is fully set forth in the following specification and shown in the accompanying drawings.

The present invention relates to belt shifters and guards for those belts which operate on two stepped cone pulleys, an object of the invention being to provide a shifting mechanism which is positive in its action and will shift the belt on one pulley prior to shifting it on the other pulley.

Another object of the invention is to provide a guard for a belt which is adjustable to guard the belt while the latter operates on any step of a stepped cone pulley.

To these and other ends, the invention consists in certain parts and combinations of parts all of which will be hereinafter described, the novel features being pointed out in the appended claims.

In the drawings: Figure 1 shows the invention in front elevation with the belt adjusted to one extreme position; Fig. 2 is a like view with the belt adjusted one step from the position shown in Fig. 1; Fig. 3 is an enlarged detail view showing the stop devices which stop the movements of the belt engaging members; Fig. 4 is a side elevation of the invention, the guard or cage being shown in open position in dotted lines; Fig. 5 is an enlarged detail view of the lower portion of the guard; and Fig. 6 is an enlarged sectional view on the line $b$—$b$, Fig. 5.

Referring more particularly to the drawings, 1 indicates a shaft mounted in brackets 2 and having a stepped cone pulley 3 thereon over which travels an endless belt 4, said belt traveling also over a stepped cone pulley 5 mounted on a suitable machine such as a lathe, all of the foregoing being well known.

The present invention employs mechanism for shifting the belt on the pulleys 3 and 5 and will now be described. Supported in any suitable manner is a frame 6 which, in this instance, is carried by a suspension piece 7 and is of rectangular form. On this frame, upper and lower belt engaging members may be mounted.

The lower belt engaging member may comprise a block 8 in which are secured two substantially-U-shaped pieces or loops 9 formed of wire and having their arms curved to conform substantially to the pulley 5 and held in the block 8 by set screws 10. This block 8 may be supported from the frame 6 in such a manner that it may move in a line substantially parallel with the general outline of the pulley 5. In this instance, this is effected by two parallel links 11 and 12 which are pivoted at 13 and 14 respectively to the block 8 and at 15 and 16 respectively to the frame 6, the link 12 having an extension arm 17 provided with a weight 18 which acts as a counter balance for the block 8 and the parts carried thereby in order that little or no resistance from the weight of the parts will be offered to the movement of the block 8. The other link 11 is provided with an extension 19 which has a pin and slot connection 20 with the operating bar 21, the operation of which will be hereinafter described.

The upper belt engaging member or device may comprise a block 22 which has two substantially U-shaped pieces 23 and 24 secured thereto by set screws 25, these U-shaped pieces or loops having their arms curved to conform substantially to the pulley. The arms of both of the U-shaped members on one side are shorter than those on the other side, so that the belt engaging device engages the belt on opposite sides at points which are unalined transversely of the belt. This arrangement prevents buckling of the belt when shifting from one step to another step of larger diameter. This construction is not necessary upon the lower cone pulley 5 as the weight of the belt assists in the shifting action but at the upper pulley, the weight of the belt tends to hold the latter against shifting to a step of greater diameter and when the belt-engaging device engages the belt at two points transversely opposite, I have found that there is a tendency, especially on old or thin belts, for the belt to roll. This tendency is overcome when the belt engaging device is constructed as described. This upper belt-engaging device may also be supported by two parallel links 26 and 27 pivoted respectively at 28 and 29 to the block 22 and at 30 and 31 to the frame 6, the arm 27 having an extension 32 which has a pin-and-slot connection 33 with an operating slide bar 34.

The operating slide bars 21 and 34 are not operated simultaneously but instead, when shifting the belt in either direction, the one which operates the belt engaging device which carries the belt downwardly on one of the pulleys, is first operated and afterward, the one which operates the other belt engaging device is operated. This is preferably effected by a mechanism which is positive in its action and which comprises an operating lever 35 pivotally mounted on a swinging link 36 and pivotally connected at 37 to a slide bar 38 the latter being guided longitudinally on the frame 6. This slide bar has a double armed lever 39 pivoted thereto at 40, the lever being in turn pivoted to the operating slides 21 and 34 at 41 and 42 respectively.

Each of the operating slides 21 and 34 is guided at one end at 43 in the frame 6 on opposite sides of the slide 38, the bearings 43 being so formed that the slides 21 and 34 may partake of a slight rocking motion. At their other ends, each of the bars 21 and 34 is provided on opposite sides with shoulders 44 and 45, the shoulders on one side being disposed toward one end of the bar while the shoulders on the other side are disposed toward the other end of the bar. Preferably, these shoulders are in the form of projections with their rear faces beveled so that the shoulders may move freely when moving in one direction. For coöperation with the shoulders 44, the frame 6 is provided with shoulders or projections 46 while shoulders or projections 47 are provided for coöperation with the shoulders 45.

Assume that it is desired to shift the belt from the position shown in Fig. 1 to the position shown in Fig. 2: The lever 35 is moved to the right in Fig. 1, thus moving the bar 38 in the opposite direction. This carries the lever 39 and the slides 21 and 34 a slight distance until one of the stops 45 on the slide 21 engages the stop shoulder 47, thus holding the slide 21 against further movement. The slide 34 continues its movement and the two-armed lever swings on the pivot 41 causing the slide 34 to be drawn also downwardly until the projection 45 thereon engages the stop 47 when the slide 34 is stopped and the upper portion of the belt is shifted. On the swinging of the lever 39 the slide 21 is also elevated until the projection 45 thereon may pass over the stop 47 when the slide again partakes of a movement which will cause the two armed lever to assume again the vertical position and the stop 45 on the bar 34 to disengage with its stop 47. When the lever 39 has again reached a vertical position, the lower belt engaging device has shifted the belt on the lower pulley 5 one step. If the belt is to be shifted in the same direction to the next steps, the operation is repeated, but if the belt is to be shifted in the reverse direction, the direction of movement of the lever 35 is reversed and the lower belt engaging device is shifted before the upper belt engaging device, because the slide 34 is first held against movement by one of its stops 44 engaging the adjacent stop 46 while the slide 21 partakes of a movement to shift the lower portion of the belt and is afterward locked against movement until the upper portion of the belt is shifted. It will thus be seen that in all instances that portion of the belt which slides from a larger diameter to a smaller is shifted before that portion which shifts from a smaller to a larger diameter and that this action is positive, not depending upon any springs or other resilient elements.

To determine when the lever 35 has been shifted the proper distance in moving from one step to another, the slide 38 may be provided with a series of notches 52 one for each step adjustment and, in any one of these notches, a spring 53 is received.

Another important feature of this invention is the provision of a belt guard which shifts with the belt and always lies alined with said belt. In this instance, this guard is in the form of a cage which practically surrounds the two laps of the belt in proximity to the lower cone pulley. Preferably, this cage is formed of two members 48 and 49 each pivoted to the horizontal portion 50 of one of the U-shaped members 9 and having spring catches 51 which snap over the U-shaped members 9 in proximity to the blocks 8, said members 48 being substantially U-shaped in horizontal cross section so as to extend about those portions of the belt in proximity to the lower cone pulley 5. While the belt shifting mechanism, hereinbefore described, provides an excellent support for the belt guard as it supports said guard for movement in a line which is practically parallel with a general outline of the cone pulley, it will be understood that the invention is not limited to this arrangement.

From the foregoing it will be noted that there has been provided a belt shifting mechanism which is positive in its action. The belt engaging devices are connected to a member to which a common operator is connected. This member is in the form of an equalizer and exerts an equal pressure on both belt engaging devices provided no other means interferes with the action of such equalizing member. As the movement of one portion of the belt is necessarily in an upward direction on one pulley, this tends to retard the action of the belt at such pulley, and, in this way, retards the action of one of the belt engaging devices, immediately throwing into action a stop device which prevents the further movement of such belt engaging device until the operator has moved the other belt engaging device to shift the unresisted portion of the belt. When the latter action takes place, the belt engaging device controlling the shifted portion is locked against further action and the belt engaging device controlling the unshifted portion is unlocked so that the pressure of the operator is transmitted to the unshifted portion of the belt to shift the latter, and thereafter to unlock or release the belt engaging device first shifted, thus placing the mechanism in condition for further action. The belt is only shifted one step at a time and may be shifted in either direction. As the belt engaging devices pass about both laps of the belt in proximity to both pulleys, the belt may be shifted when the pulleys are turning in either direction. Each belt engaging device is supported by parallel links and moves on a line which is substantially parallel with the high points of the pulley, so that each belt engaging device may be positioned about the same distance from each step and lie substantially in the same relation to the several steps.

The guard is adjustable to aline with the different steps of the pulley and has one end conforming substantially to such steps. It is arranged to surround both laps and may be open to expose both belts.

What I claim as my invention and desire to secure by Letters Patent is:

1. In combination with a stepped cone pulley, a belt operating thereon, a shifter for the belt having a device engaging the belt near the pulley, a guard for that portion of the belt in proximity to the pulley, said guard being carried with the belt-engaging device of the shifter to guard the belt as the latter operates on any step of the pulley.

2. A belt shifting mechanism for a belt operating on two stepped cone pulleys comprising two belt engaging devices for co-operating with such a belt near its two pulleys, a common operator for the belt engaging devices, and two stop devices, one for each belt engaging device, one brought into action when the belt is moved in one direction to hold its belt engaging device against movement by the operator until the other belt engaging device has shifted a portion of the belt, and the other stop device acting in the same manner when the belt is moved in the other direction.

3. A belt shifting mechanism for a belt operating on two stepped cone pulleys comprising two belt engaging devices for co-operating with such a belt near its two pulleys, two stopping means each for positively holding one of the belt engaging devices against movement until the other has moved to shift a portion of the belt, and a common operator for the belt engaging devices adapted to bring one of said stopping means into action when the belt is shifted in one direction and the other of said means into action when the belt is shifted in the other direction.

4. A belt shifting mechanism for a belt operating on two stepped cone pulleys comprising two belt engaging devices for co-operating with such a belt near its two pulleys, a member connected to the belt engaging devices, an operator connected to said member between the points of connection with the belt engaging devices, and two stop devices for holding said member against movement on either side of the connection with the operator, one of said devices operating when the belt is shifted in one direction and the other when the belt is shifted in the other direction.

5. A belt shifting mechanism for a belt operating on two stepped cone pulleys comprising two belt engaging devices for co-operating with such a belt near its two pulleys, an operator common to both of such devices, a member connected to the operator and to the belt engaging devices, and two means for holding different portions of said member against movement to hold one or the other of said belt engaging devices against movement, one of said means acting when the belt is shifted in one direction and the other of said means acting when the belt is shifted in the other direction.

6. A belt shifting mechanism for a belt operating on two stepped cone pulleys comprising two belt engaging devices for engaging such a belt near the two pulleys, two operating mechanisms, one for operating each belt engaging device, a common operator connected to both mechanisms, and stop devices for each operating mechanism arranged to be brought into operation to stop such mechanism when the latter has shifted its belt engaging device in advance of the other belt engaging device so that the common operator may act to move the operating mechanism of said other belt engaging device.

7. A belt shifting mechanism for a belt operating on two stepped cone pulleys comprising two belt engaging devices for co-operating with such a belt near its two pulleys, an operator common to both of such devices, a member connected to the operator and to both belt engaging devices, two series of suitably supported stops having connection with said member, and two fixed stops each adapted to coöperate with one of the series of stops and each acting to hold one of said belt engaging devices against movement until the other of said belt engaging devices has shifted a portion of the belt, one of said stops being effective when the belt is shifted in one direction and the other when the belt is shifted in the other direction.

8. A belt shifting mechanism for a belt operating on two stepped cone pulleys comprising two belt engaging devices for coöperating with such a belt near the pulleys, an operator common to both of said devices, a lever having the operator pivotally connected therewith between its ends, two slides pivotally connected to the ends of said lever and each operatively connected to one of the belt engaging devices, said slides each having a rocking movement, and each being provided with a series of stops thereon, and two fixed stops each adapted to coöperate with one of the series of stops to hold the corresponding slide against movement in order to prevent one of the belt engaging devices being shifted until the other belt engaging device has been shifted, one series of stops being brought into operation when the belt is shifted in one direction and the other series of stops being brought into operation when the belt is shifted in the other direction.

9. A belt shifting mechanism for a belt operating on two stepped cone pulleys comprising two belt engaging devices for coöperating with such a belt near its two pulleys, a common operator for such devices, a lever having the operator pivotally connected thereto between its ends, two slides pivotally connected to the ends of said lever, and each operatively connected to one of said belt engaging devices, said slides each having a rocking movement and each being provided with two series of stops thereon, the members of one series of stops being disposed in the direction opposite to that of the other series, two pairs of fixed stops, one pair for each slide, the members of said pairs being arranged to coöperate with the two series of stops, one series of stops on one slide being brought into operation to hold the slide against movement while the other slide moves to carry one of the series of stops thereon into engagement with one of the fixed stops to hold such slide against movement in order to free the first-held slide to permit the latter to be moved by the operator until the other portion of the belt is shifted.

10. A belt shifting mechanism for a belt operating on two stepped cone pulleys comprising two belt engaging devices for engaging the belt near the two pulleys and two pairs of parallel links each pivotally connected to one of the belt engaging devices and to a suitable support.

11. A belt shifting mechanism for a belt operating on two stepped cone pulleys comprising two belt engaging devices for engaging the belt near the two pulleys, two members having connection with said belt engaging devices, a lever pivotally connected at its ends to both of said members, and an operator having pivotal connection with said lever between the ends of the latter.

12. A belt shifting mechanism for a belt operating on two stepped cone pulleys comprising two belt engaging devices for engaging the belt near the two pulleys, two slides having connection with said belt engaging devices, a lever pivotally connected at its ends to the slides, and an operator having pivotal connection with the lever between the ends of the latter.

13. A belt shifting mechanism for a belt operating on two stepped cone pulleys comprising two belt engaging devices for engaging the belt near the two pulleys, two members having connection with said belt engaging devices, a lever pivotally connected at its ends to said members, an operator, a swinging link on which the operator is pivotally mounted, and a link pivotally connected to the operator and to the lever between the ends of the latter.

14. A belt shifting mechanism for a belt operating on two stepped cone pulleys comprising two belt engaging devices for engaging a belt near its two pulleys, two slides each connected to one of the belt engaging devices, a lever pivotally connected at its ends to the two slides, an operator, a swinging link on which the operator is mounted, and a link pivotally connected to the operator and to the lever between the ends of the latter.

15. A belt shifting mechanism for a belt operating on two stepped cone pulleys comprising two belt engaging devices for engaging a belt near its two pulleys, two pairs of parallel links each pivotally connected to a belt engaging device, two members each connected to one pair of links, a lever pivoted at its ends to the two members, and an operator connected to the lever between said ends.

16. A belt shifting mechanism for a belt operating on two stepped cone pulleys comprising two belt engaging devices for engaging a belt near its two pulleys, two pairs of parallel links each pivotally connected to a belt engaging device, two slides each connected to one pair of links, a lever pivotally connected to both slides at its ends, and an operator connected to the lever between the ends of the latter.

17. A belt shifting mechanism for a belt operating on two stepped cone pulleys comprising a belt engaging device which has two portions for coöperating with opposite edges of a belt, said portions being unalined horizontally transversely of the belt.

18. In combination with a stepped cone pulley and a belt operating thereon, a guard for the belt, and means for adjustably supporting the guard so that it may guard the belt as the latter operates on any step of the pulley.

19. In combination with a stepped cone pulley and a belt operating thereon, a guard for the belt, and a swinging link supporting said guard for adjustment to any step of the pulley.

20. In combination with a stepped cone pulley and a belt operating thereon, a guard for the belt and a pair of parallel links for supporting said guard for adjustment to any step of the pulley.

21. In combination with a stepped cone pulley and a belt operating thereon, of a guard cage surrounding both laps of the belt in proximity to the pulley, the lower end of said cage being curved substantially to conform to the pulley.

22. In combination with a stepped cone pulley and a belt operating thereon, of a guard cage surrounding both laps of the belt in proximity to the pulley and formed of two parts movable relatively to each other.

23. In combination with a stepped cone pulley and a belt operating thereon, a guard cage surrounding both laps of the belt in proximity to the pulley and formed of two relatively movable parts, each of U-shape in cross section.

24. In combination with a stepped cone pulley and a belt operating thereon, a guard cage formed of two parts and surrounding the belt in proximity to the pulley, and a movable support for said cage surrounding both laps of the belt.

25. In combination with a stepped cone pulley and a belt operating thereon, a movable support arranged between the laps of the belt in proximity to the pulley, loops extending in opposite directions from the support about the laps of the belt, and a guard cage supported by said loops and extending about the two laps of the belt.

26. In combination with a stepped cone pulley and a belt operating thereon, a movable support arranged between the laps of the belt in proximity to the pulley, loops extending in opposite directions from the support about the laps of the belt, and a guard cage supported by said loops and extending about the two laps of the belt, said guard cage comprising two members hinged to the loops.

JOHN J. FRYNE.

Witnesses:
H. H. SIMMS,
ADA M. WHITMORE.

Copies of this patent may be obtained for five cents each, by addressing the "Commissioner of Patents, Washington, D. C."